United States Patent [19]

Oelsch et al.

[11] Patent Number: 4,654,576

[45] Date of Patent: Mar. 31, 1987

[54] CONTROL SIGNAL GENERATOR

[75] Inventors: Kurt Oelsch; Klaus Schulz, both of Berlin, Fed. Rep. of Germany

[73] Assignee: Oelsch Kommanditgesellschaft, Berlin, Fed. Rep. of Germany

[21] Appl. No.: 768,617

[22] Filed: Aug. 23, 1985

[30] Foreign Application Priority Data

Aug. 28, 1984 [DE] Fed. Rep. of Germany ....... 3431523
Feb. 22, 1985 [DE] Fed. Rep. of Germany ....... 3506293

[51] Int. Cl.⁴ .............................................. H02K 35/00

[52] U.S. Cl. ....................................... 322/3; 200/6 A; 338/128

[58] Field of Search .................... 338/128; 200/6 A, 5; 340/709, 706; 322/3

[56] References Cited

U.S. PATENT DOCUMENTS 3,331,972 7/1967 Möller ............................ 338/128 X
4,489,303 12/1984 Martin ................................ 338/128
4,500,867 2/1985 Ishitobi et al. ................ 200/6 A X

FOREIGN PATENT DOCUMENTS 2261379 7/1974 Fed. Rep. of Germany .

*Primary Examiner*—Patrick R. Salce
*Assistant Examiner*—Anita M. Ault
*Attorney, Agent, or Firm*—Lee, Smith & Zickert

[57] ABSTRACT

At a control signal generator for generating a pair of control signals by means of a control stick (10) deflectable in two directions a disc (22) is attached to the control stick (10) about its pivot mounting (12). Approach sensors (18) are located in a base portion (10) and respond to the motion of the disc (22) about the pivotal point (14) of the control stick (10). This results in a compact arrangement with contactless pick-offs, which are not subject to wear and which cannot be mechanically damaged even with rude operation.

21 Claims, 8 Drawing Figures

CONTROL SIGNAL GENERATOR

The invention relates to a control signal generator for generating a pair of control signals by means of a control stick deflectable in two directions, comprising:

(a) a control stick universally pivotably mounted relative to a base portion about a pivotal point by means of a pivot mounting, (b) first sensor means, which respond to the deflection of the control stick in a first direction and supply a first control signal, and (c) second sensor means, which respond to the deflection of the control stick in a second direction and supply a second control signal.

Known control signal generators of this type have mechanical transmission members pivoted on the control stick, through which transmission members the sensor means are controlled. Due to such mechanical transmission members the control signal generators of the prior art are subject to wear or even—in case of rude operation in for example construction vehicles—to the risk of damage. Furthermore the control signal generators of the prior art have large dimensions due to constructive reasons.

By No. DE-A-31 24 838 and No. DE-A-32 20 045 control devices having two-dimensionally adjustable control sticks are known, by means of which control sticks two different functions can be controlled simultaneously. The motion of the control stick is transmitted through mechanical transmission means to control elements in form of code discs or the like. The motions of these code discs are scanned photoelectricly by means of light barriers. It is also suggested to use as code disc a ferromagnetic disc slotted according to a code key, which disc is scanned inductively. Also with this art of the control the motion of the control stick is transmitted to the sensor means formed for example by the code disc and the light barriers through mechanical transmission members, which are complicated and susceptible to trouble.

It is the object of the invention to form a control signal generator of the above mentioned type such that wear and the risk of a damage at operation is avoided to a large extent, the construction is simplified and the dimensions are reduced.

According to the invention this object is achieved in that (a) an actuating body is attached to the control stick around the pivot mounting, (b) the sensor means are formed by approach sensors, which are located in the base portion and respond to the motion of the actuating body about the pivotal point.

In the control signal generator according to the invention the signal generation is effected by contactless picking-off of an actuating body by means of approach sensors, which actuating body is attached to the control stick. Then mechanical transmission members are not used between the control stick and the sensor means. The scanning takes place without contact and thus practically without wear. The risk of mechanical damage when for instance the user exerts an excessively great force on the control stick is avoided. The construction is simpler. The omission of the mechanical transmission members results in a shorter construction of the control signal generator.

Approach sensors are known in different forms. For example inductive, capacitative or magnetic approach sensors can be used.

It is necessary to restrain the control stick in its central position. When the control stick is released, it shall return to its central position and be kept safely in this position. Furthermore the restraint must permit the displacement of the control stick in both directions with a control stick of the present type. By the force, which has to be exerted on the control stick, the user should be able to feel to which extent the control stick is deflected and whether it is deflected in one or the other direction or in an intermediate direction.

In prior art control signal generators of the present type the control stick is restrained to a central position by means of biassed springs, which opposingly act directly upon the control stick on opposite sides. When the control stick is deflected the bias of one spring increases and the bias of the opposite spring decreases such that a resulting restoring force occurs. In the central position the biases of the two springs neutralize each other. The restoring force is proportional to the deflection. Small deflections just lead to a small restoring force.

This is often disadvantageous. Small deflections are only opposed by a slight resistance. In the area of the central position the control stick is displaceable by unintentional disturbing forces, for example inertial forces due to shocks or vibrations. Furthermore the user cannot exactly feel the central position. Thus, unwelcome control signals can be generated. One could try to master this phenomenon by choosing a steeper spring characteristic. This, however, just causes a qualitative change: The area, in which the restoring forces are small, is reduced. The slope of the spring characteristic is also subject to limits. With too large a spring rate the restoring force becomes too great when the control stick is deflected considerably.

With a control stick of the type mentioned above it is therefore desirable to restrain the control stick to its central position such that it cannot be displaced unintentionally out of its central position through disturbing forces.

This can be achieved in that (c) contact surfaces are formed on the base portion, (d) furthermore spring members are attached to the base portion, which spring members engage the contact surfaces with bias, and (e) the spring members with support bodies extend over surfaces attached to the control stick, which surfaces tensionally engage the spring members when the control stick is deflected.

The spring members are not biassed between the base portion and the control stick but between the base portion and contact surfaces likewise attached to the base portion. The control stick is kept with the surfaces attached thereto between the spring members with at most a slight clearance. When the control stick is deflected one of the surfaces engages tensionally one of the spring members. A deformation of this spring member, which would permit an actuating movement of the control stick, does not however take place until the bias of the spring member is overcome. A biassed spring member located diametrically opposite the deformed spring member is completely uninvolved in this action. A compensation of biases at the control stick does not take place.

Some embodiments of the invention will now be described in greater detail with reference to the accompanying drawings.

Figure 1:
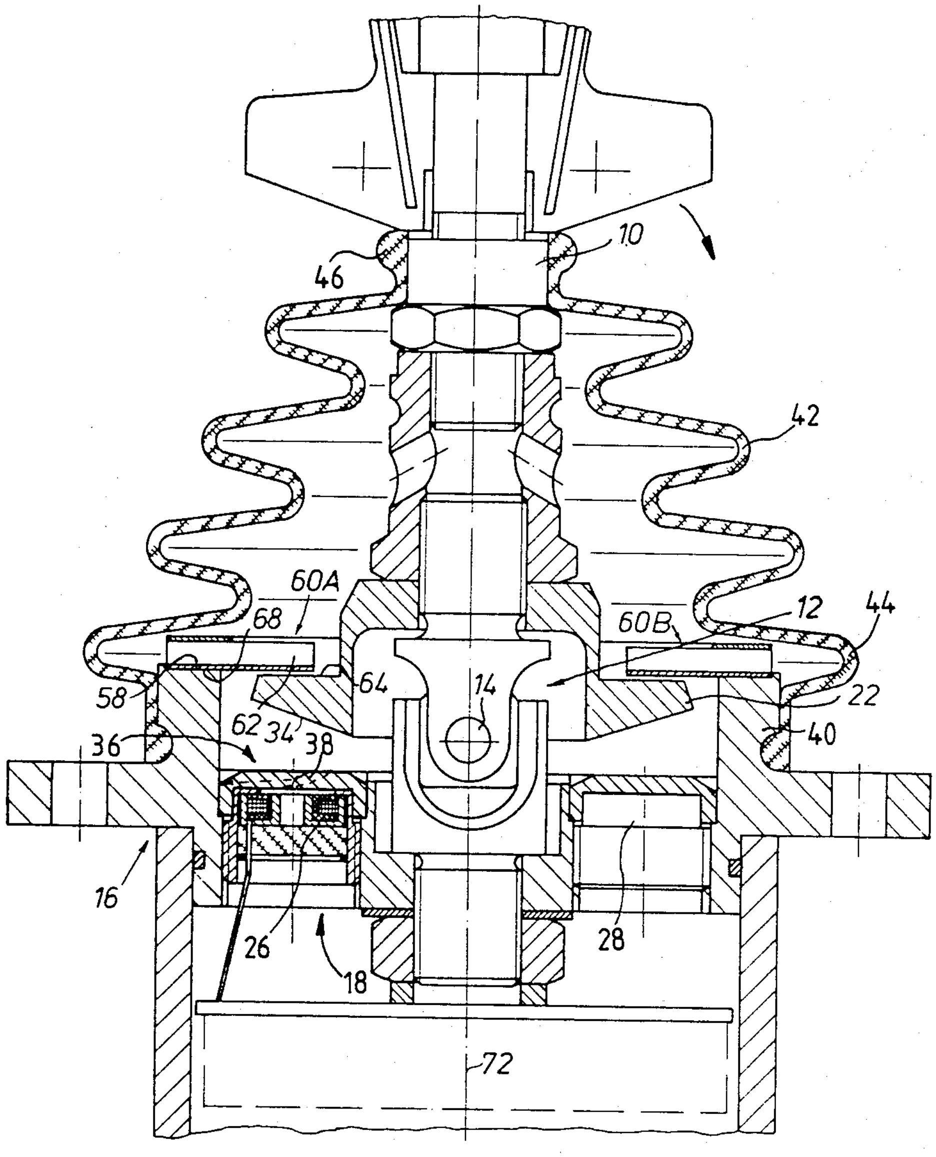
FIG. 1 shows a longitudinal section through an embodiment of a control signal generator.

The control signal generator comprises a control stick 10, which is universally pivotably mounted relative to a base portion 16 about a pivotal point 14 by means of a pivot mounting 12 in the form of a cardan joint. First sensor means 18 are provided, which respond to the deflection of the control stick 10 in a first direction X from the left to the right in FIG. 2, and which supply a first control signal, and second sensor means are provided, which respond to the deflection of the control stick 10 in a second direction Y from below to the top in FIG. 2, and which supply a second control signal. The second sensor means is identical to the first sensor means 18 but is displaced 90° relative thereto and is therefore not illustrated. In the described control signal generator an actuating body in the form of a disc 22 is attached to the control stick 10 around the pivot mounting 12. The first sensor means 18 and second sensor means are formed by approach sensors, which are located in the base portion and respond to the movement of the disc 22 about the pivotal point 14. In the embodiment of FIG. 1 the disc 22 is made of ferromagnetic material. The first approach sensor 18 are formed by pairs of peat core coils 26,28, diametrically opposite with regard to the pivotal point 14, the extraneous fields of which peat core coils are variable through the disc 22. The second approach sensor is formed similarly. The variations of the inductivities of the opposite peat core coils thus caused when the control stick 10 and the disc 22 are deflected can be converted to an electrical output signal, for example in the way disclosed in No. DE-A-22 61 379 or No. DE-A-32 12 149. The disc 22 has a tapered annular surface 34 on its side facing the base portion 16, which annular surface 34 interacts with the first approach sensors 18,20 and second approach sensor. The base portion has on its surface facing the disc 22 an annular area 36 being corrugated in circumferential direction and having four wave troughs 38 angularly offset by 90°. The peat core coils 26,28 of the approach sensor 18 and core coils of the second approach sensor are likwise arranged angularly offset by 90° between the wave troughs. This formation has the following purpose: When the control stick 10 is deflected straight toward one of the peat core coils 28 as it is indicated by an arrow in the right part of FIG. 1, then the tapered surface 34 approaches directly the peat core coil 28 until the tapered surface 34 substantially tangentially engages the annular area 36 in the area of the peat core coil 28. If the annular area 36 would be plane, then, in case of deflection of the control stick 10 at an angle of 45° with regard to the approach sensor 18, the disc 22 with the tapered annular surface 34 would engage tangentially between the peat core coils, and would have a considerable distance from the surface of the annular area 36 in the area of the peat core coils. The signals would be correspondingly weaker. Due to the corrugated shape of the annular area 36, the tapered annular surface 34 of the disc 22 can snuggle into the wave troughs in this 45°-position and thus the tapered annular surface 34 can be made to approach the peat core coils of the approach sensors more closely.

The base portion 16 is made of nonmagnetic material. The control stick 10 is mounted on the base portion 16 through a cardan joint. The approach sensors are arranged in the base portion in the annular area 36 around the cardan joint. A collar 40 is provided on the base portion around the annular area 36. A generally conical rubber sleeve 42 is located with its wide end 44 on the collar and is attached with its narrow end 46 to the control stick 10. This results in a simple and sturdy construction, the movable mechanical portions of which are sealingly enclosed. The approach sensors have the function of transmitting signals out of this enclosed space. The electrical signals from the first approach sensors 18 and second approach sensors are processed in an electronic (not illustrated) unit located below the base portion 16.

The disc can instead be made of nonmagnetic material. Then permanent magnets can be inserted in the disc. In this case the approach sensors are formed as sensors sensitive to magnetic field. The approach sensors can for example be formed as field plate or as Hall sensors. The approach sensors can also be magnetoresistive sensors.

The disc can also be produced of nonmagnetic material, inserts made of soft-magnetic material being provided in the disc. The approach sensors can be formed by induction coils instead of peat core coils.

Instead, the approach sensors can also be capacitative or other appropriate sensors.

Contact surfaces 58 are formed on the base portion 16. Furthermore, spring members 60 are attached to the base portion 16, which spring members are biassed and engage the contact surface 58. The spring members 60 extend with support bodies 62 over surfaces 64 attached to the control stick 10, which surfaces tensionally engage the spring members 60 when the control stick is deflected. As can be seen from FIG. 2, two pairs of diametrically opposite spring members 60 are provided, which are distinguished in FIG. 2 as 60A, 60B and 60C, 60D, respectively. One of these pairs 60A, 60B is directed with its support bodies in the above mentioned first direction X, which signifies that it is located essentially in the paper plane of FIG. 1. The other of these pairs is directed with its support bodies in the above mentioned second direction Y, that is perpendicularly to the paper plane of FIG. 1, as can be seen from FIG. 2.

Figure 2:
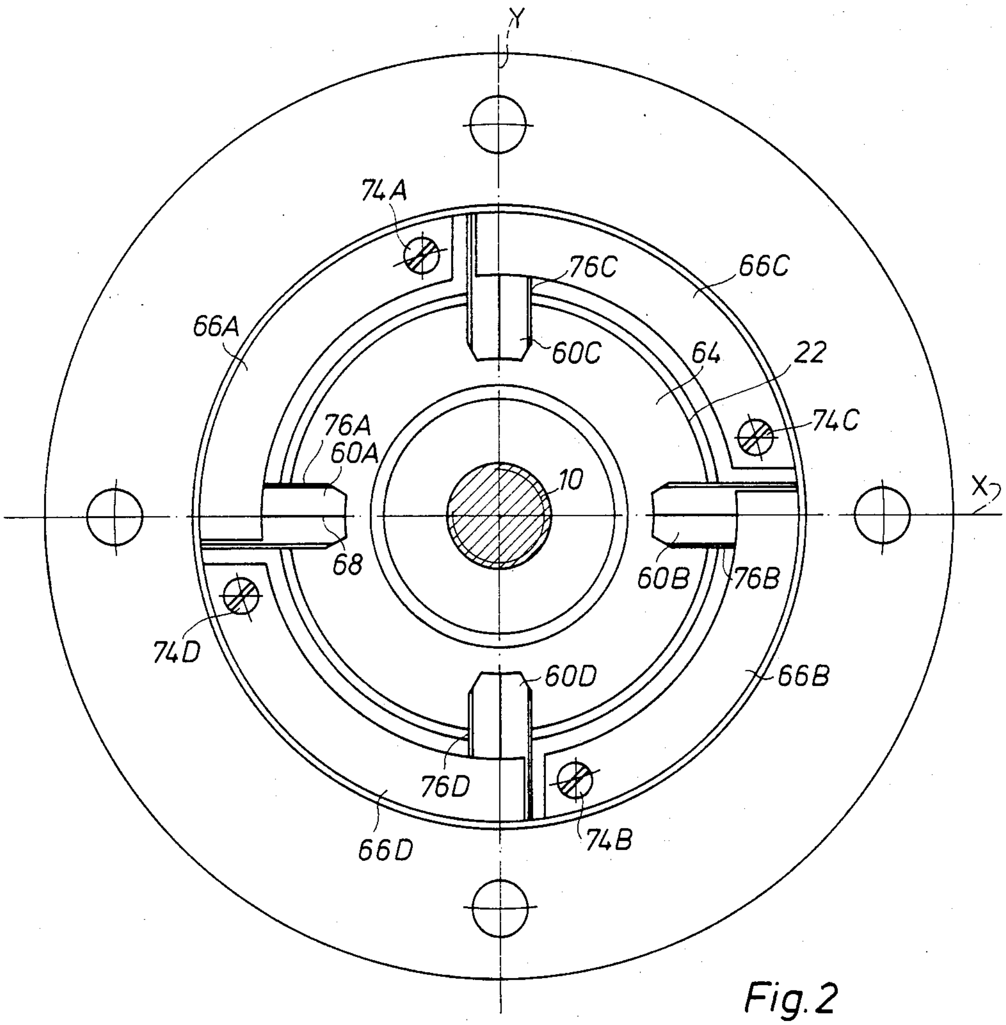
FIG. 2 shows a section taken along the line II—II of FIG. 1 with the sleeve removed.
Figure 3:
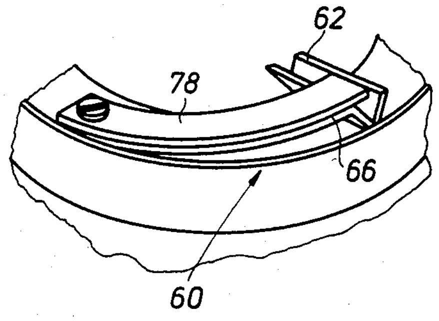
FIG. 3 is a perspective illustration and shows one of the spring members with the support member integral therewith.
Figure 4:
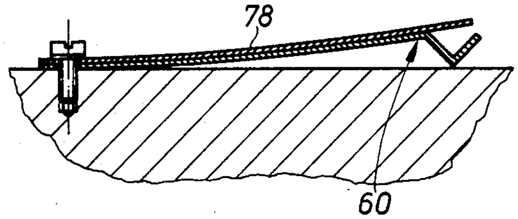
FIG. 4 is a side view of the spring member and the additional leaf spring engaging said spring member.

As may be seen in FIG. 2, each of the spring members 60A, 60B, 60C and 60D has a biassed leaf spring 66A, 66B, 66C and 66D, respectively, attached to the base body 16. These leaf springs 66A, 66B, 66C and 66D have arcuate shape and extend around the disc 22. Furthermore, each spring member 60 is biassed by a supplementary biassed leaf spring 78 attached to the base body 16.

The support bodies 62 are formed by spring sheet metal portions with v-shaped section, which are formed at the end of the leaf springs 66 and which engage with their center edges 68 the contact surface 58. The base portion 16 forms a collar 40, which is arranged coaxially to the axis 72 of the control stick 10 (when the control stick 10 is located in its central position). The annular top surface of this collar 40 forms the contact surfaces 58. The disc 22 has, as the above mentioned surface 64, a plane annular surface located substantially in the plane of the top surface of the collar 40. A tolerance of 0 to 0.2 mm can be provided therebetween. The spring members 60 extend with their support bodies 62 over these plane annular surfaces with small clearance determined by this tolerance. Each of the additional leaf springs 78 together with the associated spring member 60A, 60B, 60C and 60D is attached with one end to the top surface of the collar 40 by means of screws 74A to 74D. It extends through approximately 90° over the front surface and engages with the other end an outer edge 76A, 76B, 76C and 76D, respectively, of a v-shaped support member 62A, 62B, 62C and 62D, respectively.

The described arrangement operates as follows:

When a force is exerted on the control stick 10, for example to the right in the paper plane of FIG. 1, the surface 64 engages the spring member 60A. However, as long as the force effective at the control stick 10 does not overcome the bias of the spring member 60A, through which it is in engagement with the contact surface 58, the control stick 10 cannot be deflected. Thus no unintentional movements of the control stick 10 under the influence of disturbing forces can take place, as it would be the case with a spring characteristic originating linearly from zero. When the control stick 10 is moving to the right in FIG. 1, the spring member 60B is without effect. This safe restraint of the control stick 10 in the central position is of particular importance for a control signal generator of the present type, in which the movement of the control stick 10 is picked-off without contact. Then no other supporting or restoring forces than the spring restraint act upon the control stick 10, such that the control stick 10 is particularly susceptible to external disturbing forces. Also the picking off without contact can be executed very sensitively, such that even small displacements cause a noticeable control signal.

When the bias of the spring member is overcome, the control stick 10 is deflected by deforming the spring member 60A. The spring members 60C and 60D perpendicular thereto are practically not deformed with this pivotal movement. Rather the spring members 60C and 60D pivot on the surface 64 about the center edges 68 of the two support members 62C and 62D. The spring member 60B is also not influenced, as mentioned, when the control stick 10 is pivoted to the right in FIG. 1.

The same applies analogously to a pivotal movement of the control stick perpendicular to the paper plane of FIG. 1. For example the spring member 60D is then deformed. The surface 64 pivots about the central edges 58 of the support members 62A and 62B. The spring member 60C is not influenced.

When the control stick 10 is pivoted in a direction located between the first and the second direction X and Y, respectively, thereby causing simultaneous generation of first and second control signals, then two spring members, for example 60A and 60D, must be simultaneously deformed. This becomes noticeable by the user as an increased resistance. The user can thus feel the first and the second direction, in which only one signal is generated, because in these directions a minimum resistance against the displacement is felt.

Figure 5:
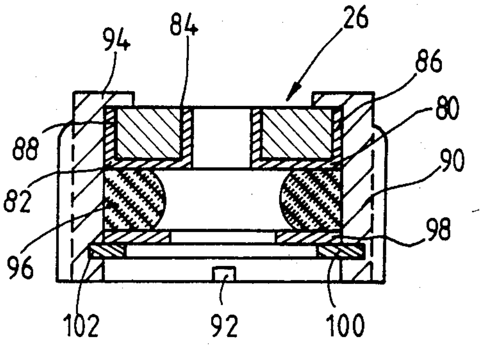
FIG. 5 shows at an enlarged scale the arrangement of one of the peat core coils.

FIG. 5 shows at an enlarged scale the construction of the peat core coils 26 etc.

The peat core coil 26 comprises a core of ferrite 80 which has a annular disc-shaped bottom 82 and an inner and an outer cylindrical collar 84 and 86, respectively. The winding 88 of the peat core coil 26 is located in the annular space thus formed. The peat core coil 26 is located in a cylindrical housing 90, which has a transverse slot 92 on one side, and an edge 94 extending to the interior on the other side. The front surface of the outer collar 86 engages the edge 94. The collar 86 is resiliently pressed against this edge 94 by an elastic ring 96 engaging the bottom 82. The ring 96 is supported on an annular disc 98. The annular disc 98 is held by a snap ring 100, which snaps in a groove 102 in the inner wall of the housing 90. In this way the peat core coil 26 is always held in an exactly defined position in the housing 90. The housing 90 is screwed into the base portion 16 by means of a thread 106.

Figure 6:
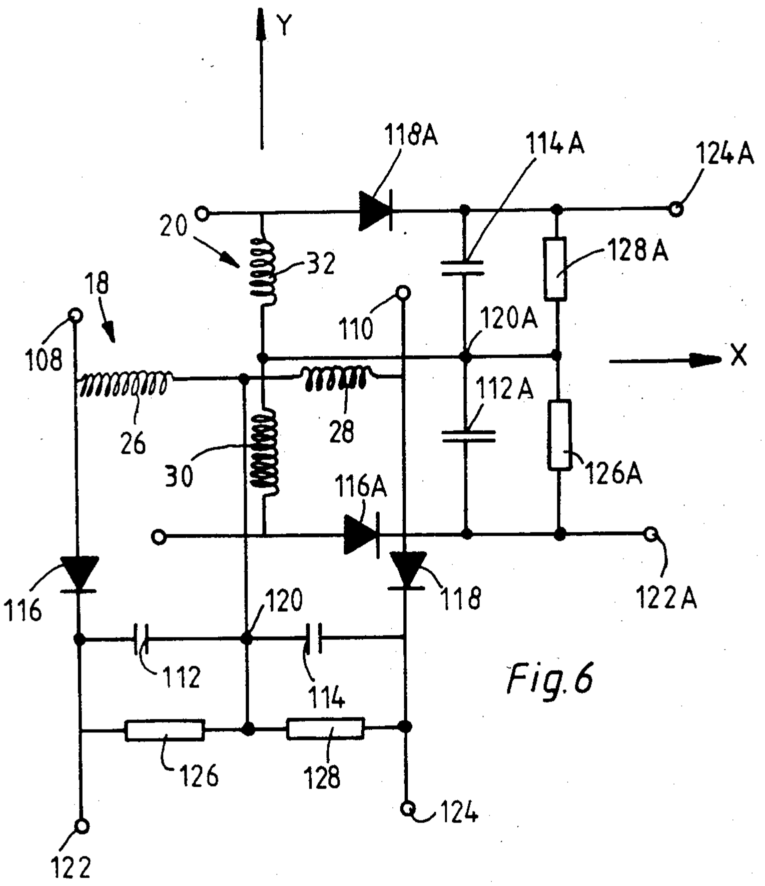
FIG. 6 shows schematically the circuit of the peat core coils.

FIG. 6 shows schematically the circuit arrangement and the arrangement in space of the peat core coil 26, 28 of the first approach sensor 18 and 30, 32, of the second approach sensor 20 respectively. The peat core coil 26 and 28 are connected in series and are in contact with an alternating voltage, which is applied to terminals 108, 110. Each of the peat core coils 108 and 110 has connected thereto a capacitor 112 and 114, respectively, in series with a diode 116 and 118, respectively. The diodes 116 and 118 are connected such that the capacitors 112 and 114 are charged with the same polarity with regard to the common connecting point 120, and that the difference of the capacitor voltages are picked off between outlet terminals 122, 124. One resistor each 126 and 128, respectively, is connected in parallel to each of the capacitors 112 and 114.

The two peat core coils 26 and 28 form a voltage divider. The part of the alternating voltage dropping across each of the peat core coils 26 and 28 is a function of the inductivity of the peat core coil 26 and 28, respectively. These inductivities are influenced inversely by the disc 22, when the control stick 10 is deflected. The alternating voltages dropping across the peat core coils 26 and 28 are rectified by the diodes 116 and 118, respectively and charge the capacitors 112 and 114. When the control stick 10 is located in its central position and the inductivities of the two peat core coils 26 and 28 are equal, the two capacitors 112 and 114 are charged to the same voltage. The voltage between the outlet terminals 122 and 124 then becomes zero.

The circuit of the second sensor means 20 associated with the two peat core coils 30 and 32 acts in a similar way. Corresponding portions are designated by the same numerals as with the sensor means 18, but characterized by an "A".

Figure 7:
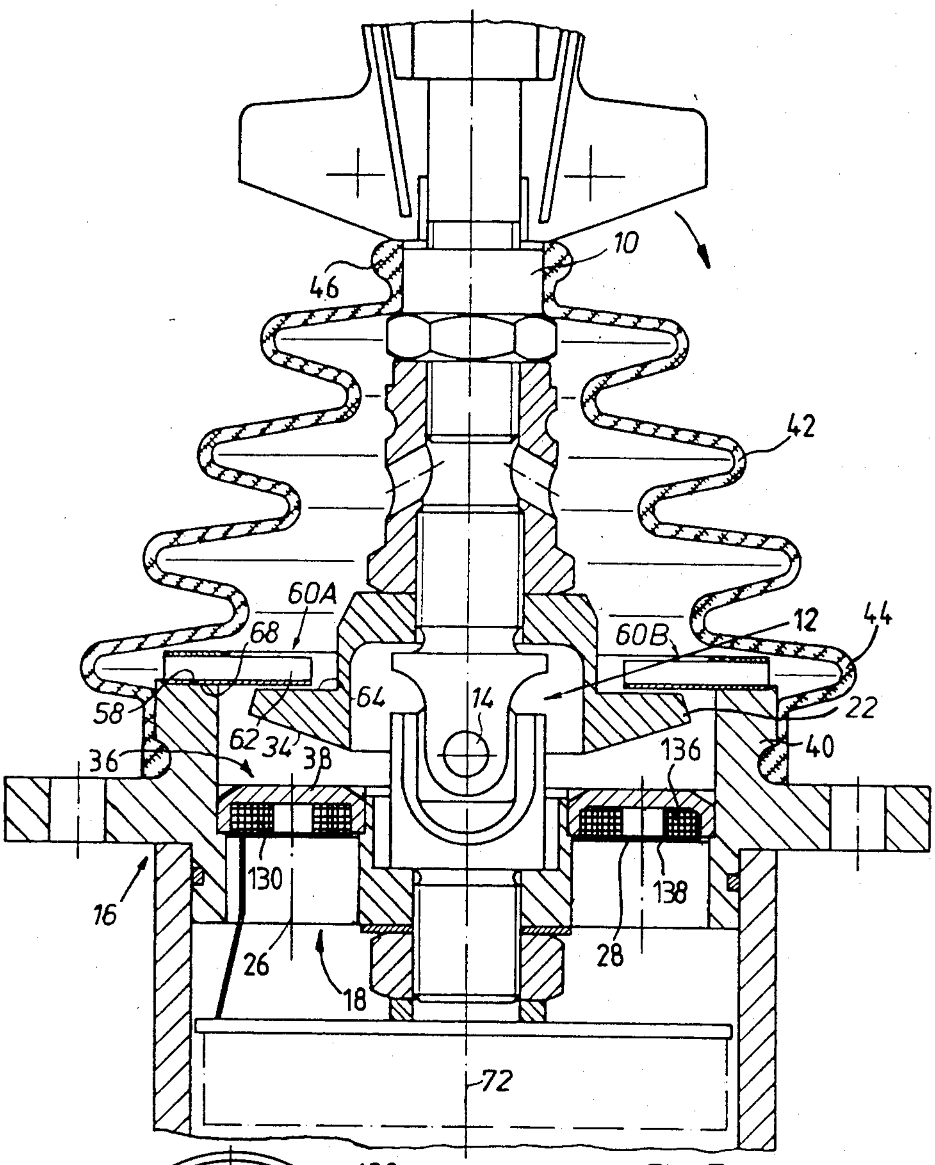
FIG. 7 shows in an illustration similar to FIG. 1 a modified embodiment of the approach sensors.
Figure 8:
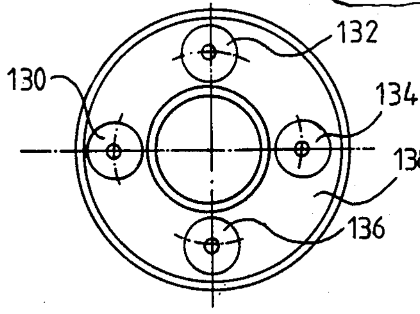
FIG. 8 is a plan view of the approach sensors.

In the embodiment according to FIG. 7, air-core coils 130, 132, 134, 136, that is coils without ferromagnetic core, are used as approach sensors instead of the peat core coils. The air-core coils 130, 132, 134 and 136 are angularly offset by 90° on a common ring 138 made of soft-magnetic material. The ring forms a magnetic return impedance and "poles" the air-core coils. This arrangement has the advantage, that a better temperature attitude results than with the peat core coils, because the ring 138 has the same attitude for all four coils 130 to 136.

We claim:

1. Control signal generator for generating a pair of control signals by means of a control stick comprising (a) a control stick, (b) a base, (c) means for universally, pivotably mounting said control stick on said base, (d) a disc shaped actuating body rigidly attached to said control stick and having a tapered annular surface on its side facing said base, said tapered annular surface being arranged, upon pivotal movement of said control stick from a central position, to approach said base on one side and to move away from said base on the other side, (e) first contactless approach sensor means located on said base and interacting with said tapered annular surface to respond to motion of said actuating body from said central position in a first direction to provide a first control signal, and (f) second contactless approach sensor means located on said base and interacting with said tapered annular surface to respond to motion of said actuating body from said central position in a second direction to provide a second control signal.

2. Control signal generator as set forth in claim 1 in which (a) the actuating body includes ferromagnetic material and (b) the approach sensors comprise induction coils, the inductivities of which are variable as a function of the deflection of the control stick due to the ferromagnetic material of the actuating body.

3. Control signal generator as set forth in claim 2, in which the induction coils are peat core coils.

4. Control signal generator as set forth in claim 2, in which (a) the approach sensors have two induction coils each, which are arranged on diametrically opposite sides of the central position, (b) the two induction coils are connected in series to an alternating voltage and thus form a voltage divider, (c) a capacitor is connected to be charged by the part of the alternating voltage drop across each of the induction coils through a diode, and (d) the voltages applied to the capacitors are mutually opposed for providing an output direct-current of the approach sensor.

5. Control signal generator as set forth in claim 2, in which (a) the induction coils are formed as air-core coils, and (b) the air-core coils are arranged on a common ring made of soft-magnetic material.

6. Control signal generator as set forth in claim 1, in which (a) the actuating body is made of nonmagnetic material, (b) inserts made of soft-magnetic material are provided in the actuating body.

7. Control signal generator as set forth in claim 1, in which (a) the actuating body is made of nonmagnetic material, (b) permanent magnets are inserted in the actuating body, and (c) the approach sensors are formed as sensors sensitive to magnetic field.

8. Control signal generator as set forth in claim 7, in which the approach sensors are formed as Hall sensors.

9. Control signal generator as set forth in claim 7, in which the approach sensors are magnetoresitive sensors.

10. Control signal generator as set forth in claim 1, in which the approach sensors are capacitative sensors.

11. Control signal generator as set forth in claim 1, in which (a) the base has on its surface facing the actuating body an annular area corrugated in a circumferential direction and having four wave troughs angularly offset by 90°, and (b) the approach sensors are likewise angularly offset by 90° between the wave troughs.

12. Control signal generator as set forth in claim 1, in which (a) the control stick is mounted on the base through a cardan joint, (b) the approach sensors are arranged in the base in an annular area around the cardan joint, (c) a collar is provided at the base portion around the annular area, and (d) a generally conical rubber sleeve is located with its wide end on the collar and is attached with is narrow end to the control stick.

13. Control signal generator for generating a pair of control signals by means of a control stick comprising (a) a control stick, (b) a base, (c) contact surfaces formed on the base, (d) means for universally, pivotably mounting said control stick on said base, (e) an actuating body rigidly attached to said control stick, (f) first contactless approach sensor means located on said base and interacting with said actuating body to respond to motion of said actuating body from said central position in a first direction to provide a first control signal, (g) second contactless approach sensor means located on said base and interacting with said actuating body to respond to motion of said actuating body from said central position in a second direction to provide a second control signal, (h) spring members attached to the base and engaging the contact surfaces with bias, and (i) the spring members having support bodies extending above the actuating body and tensionally engaging the actuating body when the control stick is deflected.

14. Control signal generator as set forth in claim 13, in which the spring members have longitudinal support bodies radially arranged in regular arrangement about the control stick, and which extend over the actuating body.

15. Control signal generator as set forth in claim 14, in which (a) two pairs of diametrically opposite spring members are provided, and (b) one of these pairs is directed with its support bodies in a first direction, and the other of these pairs is directed with its support bodies in a second direction.

16. Control signal generator as set forth in claim 15, in which each of the spring members has a biassed leaf spring attached to the base.

17. Control signal generator as set forth in claim 16, in which the leaf springs are arcuate and extend around the actuating body.

18. Control signal generator as set forth in claim 15, in which the support bodies are formed by spring sheet portions with v-shaped section, which are formed at the end of the leaf springs and which engage the contact surface with their center edges.

19. Control signal generator as set forth in claim 14, in which (a) the base includes a collar which is arranged coaxially to an axis of the control stick and the top surface of which forms the contact surface, (b) the actuating body has a plane annular surface located substantially in the plane of the top surface, and (c) the support bodies extend over the annular suface with small clearance.

20. Control signal generator as set forth in claim 17, 18 or 19 in which each of the spring members is biassed by a supplementary biassed leaf spring attached to the base.

21. Control signal generator as set forth in claim 20, in which each of the additional leaf springs (a) together with the associated spring member carrying the support body is attached with one end to the top surface of the collar, (b) extends through approximately 90° over the top surface and (c) engages with its other end an outer edge of a v-shaped portion of the support body.

* * * * *